United States Patent [19]

Watkin et al.

[11] Patent Number: 5,285,601
[45] Date of Patent: Feb. 15, 1994

[54] MAGNETIC TRACK SELF-PROPELLED BLAST CLEANING MACHINE

[75] Inventors: Robert B. Watkin; David A. Hanson, both of Peachtree City, Ga.

[73] Assignee: The Wheelabrator Corporation, La Grange, Ga.

[21] Appl. No.: 48,925

[22] Filed: Apr. 16, 1993

Related U.S. Application Data

[63] Continuation of Ser. No. 815,437, Dec. 31, 1991, abandoned.

[51] Int. Cl.$^5$ .............................. B24C 5/00; B24C 7/00
[52] U.S. Cl. ........................................ 51/430; 51/429; 51/425
[58] Field of Search ................. 51/428, 429, 430, 425, 51/426, 410

[56] References Cited

U.S. PATENT DOCUMENTS

| | | |
|---|---|---|
| 1,342,488 | 6/1920 | Woods . |
| 1,362,518 | 12/1920 | Villiers . |
| 2,118,276 | 5/1938 | Temple . |
| 3,088,429 | 5/1963 | de Fine Brandt Johannesson . |
| 3,566,543 | 3/1971 | Fogle . |
| 3,638,600 | 2/1972 | Modrey . |
| 3,827,188 | 8/1974 | Fuma et al. . |
| 3,859,948 | 1/1975 | Romano et al. . |
| 3,863,393 | 2/1975 | Goff . |
| 3,864,876 | 2/1975 | Diehn . |
| 3,900,968 | 8/1975 | Shigyo .................. 51/5 R |
| 3,960,229 | 6/1976 | Shio . |
| 3,984,944 | 10/1976 | Maasberg et al. ......... 51/9 M |
| 4,020,596 | 5/1977 | Bergh .................... 51/9 M |
| 4,029,164 | 6/1977 | Urakami ................. 51/429 |
| 4,092,942 | 6/1978 | Kurohiji et al. . |
| 4,132,279 | 2/1979 | van der Lende et al. . |
| 4,149,345 | 4/1979 | Atsuchi . |
| 4,199,905 | 4/1980 | Neidigh et al. . |
| 4,286,417 | 9/1981 | Shelton ................. 51/429 |
| 4,319,436 | 3/1982 | Van Fossen . |
| 4,433,511 | 2/1984 | Swain ................... 51/429 |

Primary Examiner—Bruce M. Kisliuk
Assistant Examiner—Bo Bounkong
Attorney, Agent, or Firm—Rockey, Rifkin and Ryther

[57] ABSTRACT

The blast machine consists of a self-propelled vehicle including a pair of independently driven magnetic treads capable of adhering to and traversing ferromagnetic vertical surfaces and the underside of ferromagnetic horizontal surfaces. The blast machine includes a blast unit having a pair of blast wheels supported on the magnetic treads for propelling the blast unit over ferromagnetic surfaces The blast unit is mounted so as to be able to pivot about two axes relative to the treads so that the treads can follow and traverse curved surfaces without changing the orientation of the blast unit. The treads can also flex allowing them to traverse surfaces having varying contours. Moreover, the angle of the blast unit relative to the surface to be cleaned can be adjusted to ensure the proper orientation for blast cleaning The blast unit includes a unique mechanism for retrieving spent abrasive and debris from the surface and a separator for separating the reusable abrasive from the debris when the unit is oriented either vertically or upside down.

31 Claims, 7 Drawing Sheets

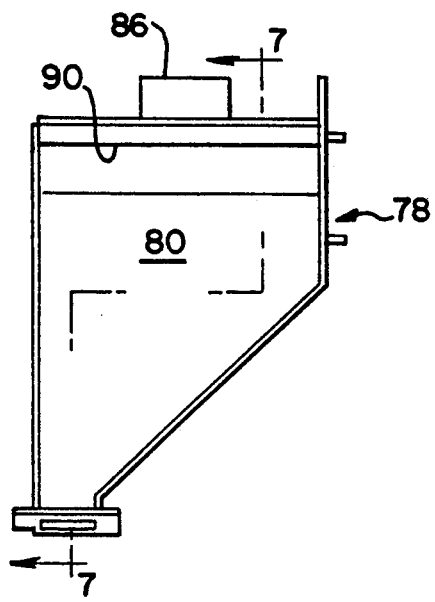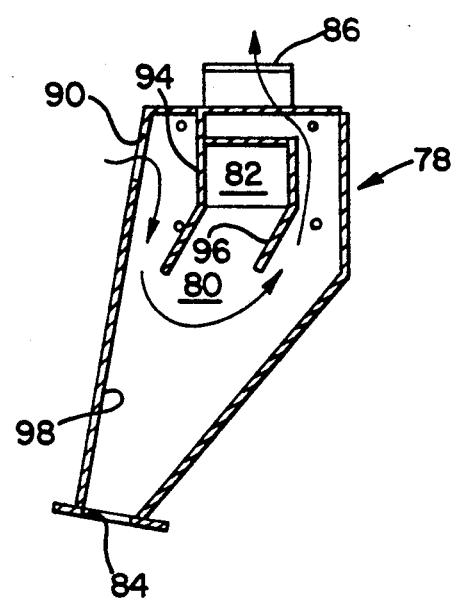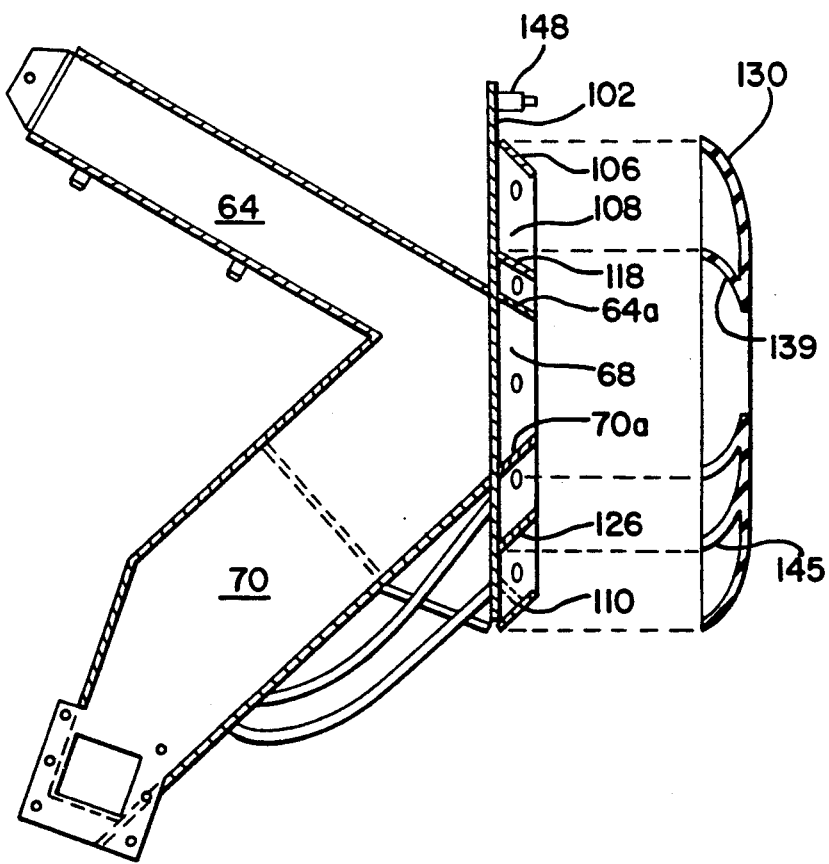

MAGNETIC TRACK SELF-PROPELLED BLAST CLEANING MACHINE

This is a continuation of copending application Ser. No. 07/815,437 filed on Dec. 31, 1991 now abandoned.

BACKGROUND OF THE INVENTION

The invention relates, generally, to blast cleaning devices and, more particularly, to a blast cleaning machine having magnetic treads for cleaning substantially vertical surfaces as well as the underside of horizontal surfaces such as are typically found on ship hulls and storage tanks.

Blast cleaning machines typically consist of a blast wheel having a plurality of blades extending radially therefrom. The blast wheel is mounted in a housing and is rotatably driven at high speed. Abrasive such as steel shot is fed onto the blades and is projected against the surface to be cleaned. The impact of the abrasive with the surface to be cleaned dislodges paint, rust and other debris from the surface. Typically, the debris is removed from the system and the spent abrasive is recirculated back to the blast wheel. The housing can either be of a stationary type into which the article to be cleaned is placed or a mobile type that is propelled over the surface to be cleaned.

One such mobile blast cleaning machine is disclosed in U.S. Pat. No. 4,377,922 issued to Bergh. While such a device performs very well on horizontal and near horizontal surfaces; it cannot clean vertical surfaces nor can it clean the underside of horizontal surfaces such as the bottom of ship hulls. A blast cleaner specifically designed for cleaning vertical surfaces is disclosed in U.S. Pat. No. 3,034,262 issued to Pawlson. The Pawlson device is a relatively small, hand-held unit that is impractical for large cleaning jobs or jobs where it is impractical or impossible for a human operator to work. Finally, U.S. Pat. No. 3,864,876, issued to Diehn, discloses a fixture for supporting a blast cleaning device fixed to a vertical surface by electromagnets.

Thus, a blast cleaner that can traverse vertical and the underside of horizontal surfaces and efficiently clean large areas is desired.

SUMMARY OF THE INVENTION

The blast machine of the invention consists of a self-propelled vehicle including a pair of independently driven magnetic treads capable of adhering to and traversing vertical ferromagnetic surfaces and the underside of horizontal ferromagnetic surfaces. The blast machine includes a blast unit having a pair of blast wheels supported by the magnetic treads. The treads are mounted so as to be able to pivot about two axes relative to the blast unit so that the treads can follow and traverse curved surfaces. The treads can also flex allowing them to traverse surfaces having varying contours. Moreover, the angle of the blast unit relative to the surface to be cleaned can be adjusted to ensure the proper orientation for blast cleaning. Finally, the blast unit includes a unique mechanism for retrieving spent abrasive and debris from the surface and a separator for separating the reusable abrasive from the debris when the unit is oriented either vertically or upside down.

BRIEF DESCRIPTION OF THE DRAWINGS

FIG. 6 is a back view of the separator of the blast machine.

FIG. 7 is a section view taken along line 7—7 of FIG. 6.

FIG. 8 is an exploded partial section view showing the blast corridor and blast zone of the invention.

DETAILED DESCRIPTION OF THE INVENTION

Figure 1:
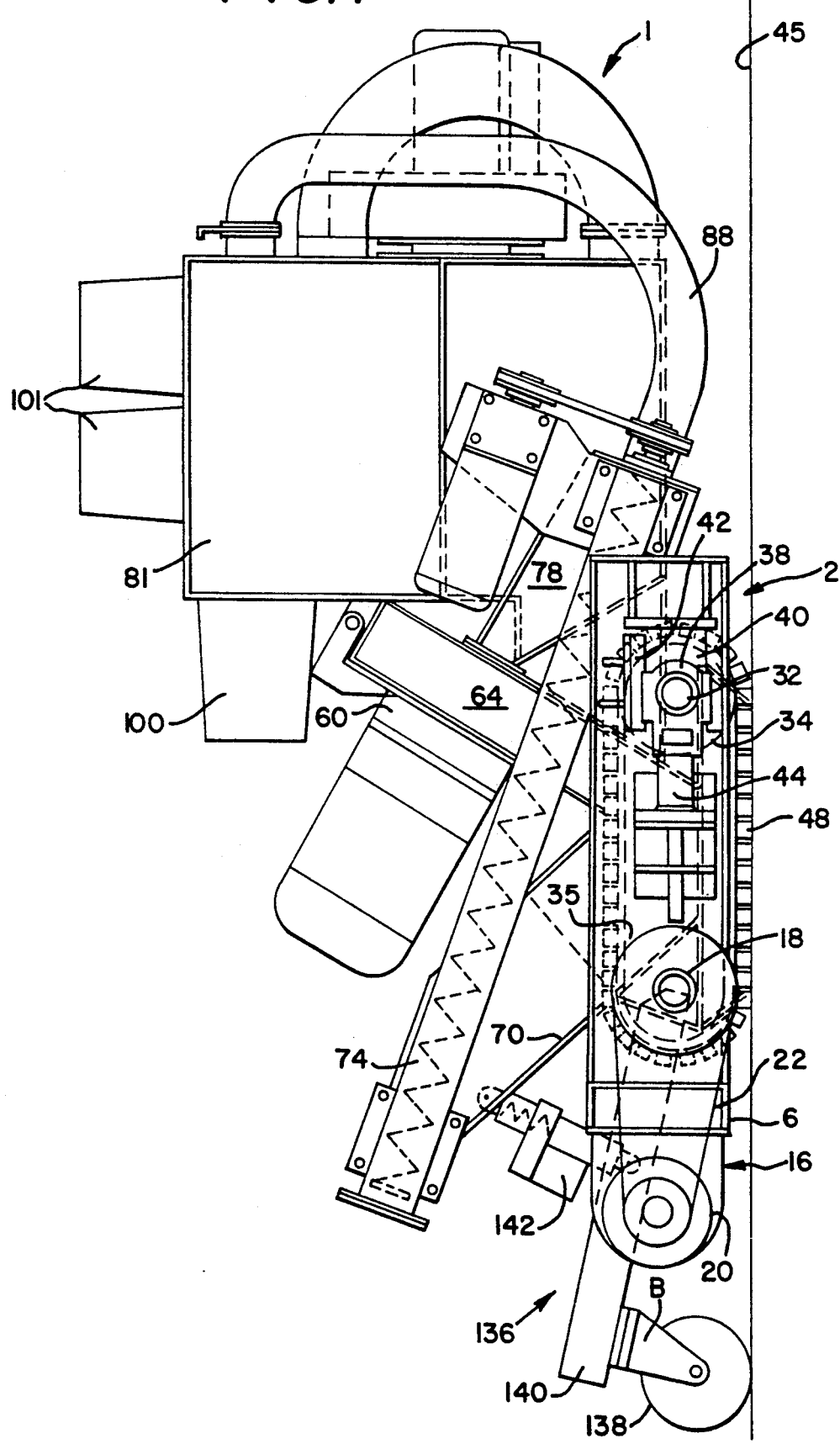
FIG. 1 is a side view of the blast machine of the invention shown traversing a vertical surface.
Figure 2:
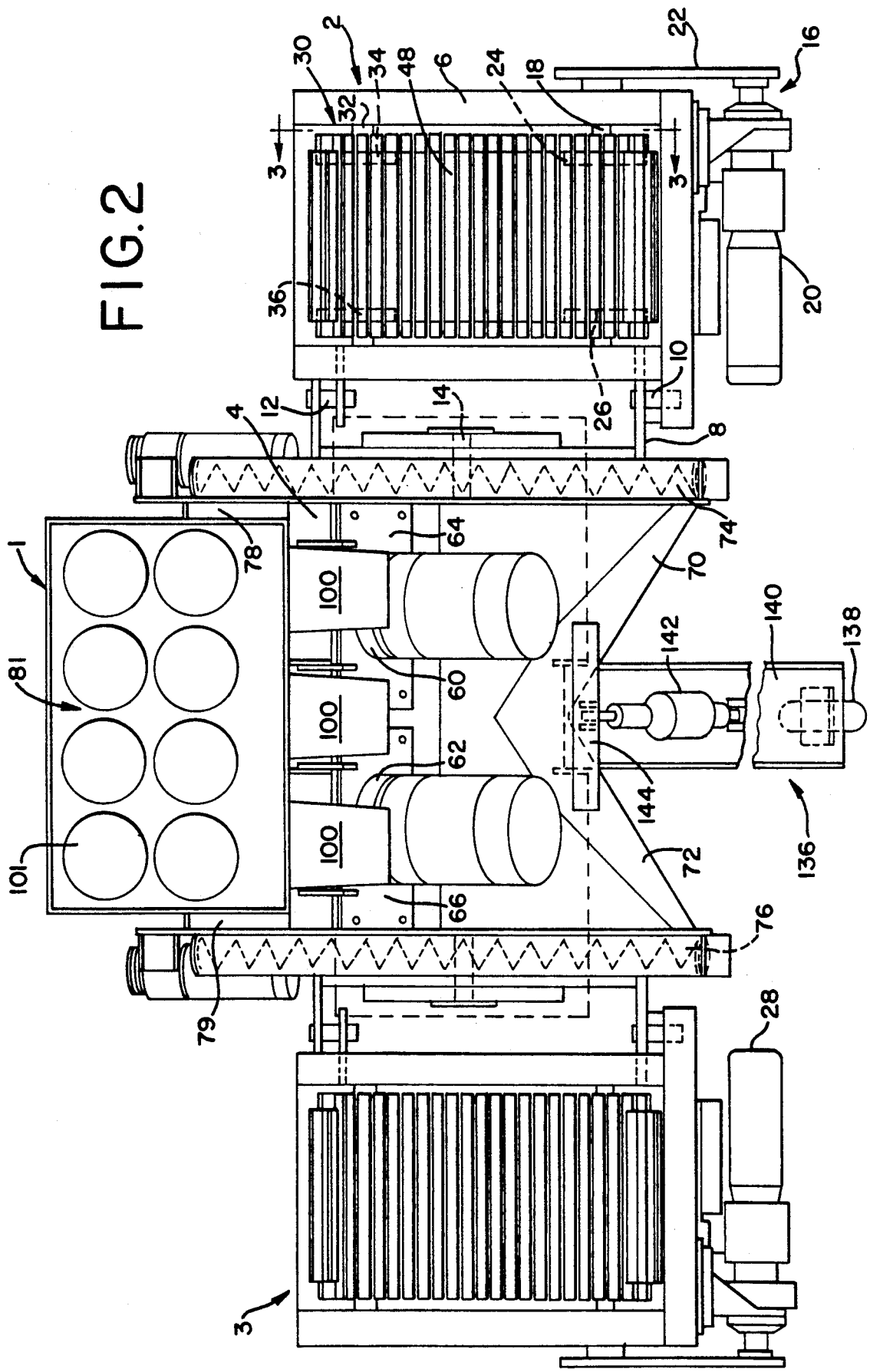
FIG. 2 is a back view of the blast machine of the invention.

Referring more particularly to FIGS. 1 and 2, the blast machine of the invention consists of a blast unit 1 supported between a pair of tread units 2 and 3. The blast unit 1 is supported on frame member 4 which is pivotably connected to the tread units 2 and 3 to allow relative movement between the tread units and the blast unit as will hereinafter be described. Because the construction and operation of tread units 2 and 3 are identical, specific reference will be made only to tread unit 2.

Tread unit 2 consists of a substantially rectangular tread frame 6 pivotably connected to C-shaped support arm 8 at pivot pins 10 and 12. Support arm 8 is, in turn, pivotably connected to blast unit frame 4 by pivot pin 14. Thus, pivot pins 10 and 12 form a first axis of rotation and pivot pin 14 forms a second axis of rotation between tread frame 6 and blast unit frame 4. As a result tread units 2 and 3 can freely pivot relative to blast unit 1 along two perpendicular axes such that the blast machine can traverse curved and contoured surfaces.

Tread unit 2 includes a drive assembly 16 consisting of an axle 18 rotatably supported in bearings in frame 6. Axle 18 is connected to a drive motor 20 via a suitable transmission member 22 and supports a pair of spaced sprockets 24 and 26. It should be noted that drive motor 20 is preferably synchronized with drive motor 28 of track unit 3 such that both motors are driven at the same speed to propel the vehicle along a straight line. To turn the vehicle, the speed of one of the drive motors is either increased or decreased. The vehicle's operator can control the speed of the motors from a remote location using suitable electronic controls connected to the blast machine via cabling.

Tread unit 2 also includes an idler assembly 30 consisting of axle 32 supporting a pair of spaced sprockets 34 and 36. Disposed over the sprockets 24 and 34 and 26 and 36 are a pair of chains, only one of which is shown at 35 in FIG. 1. As best shown in FIG. 1, each end of axle 32 is supported in a bearing 38 which, in turn, is slidably supported between rails 40 and 42 so as to be able to reciprocate therein towards and away from drive assembly 16. A screw jack 44 moves bearing 38 along rails 40 and 42 to change the distance between axles 18 and 32 and thereby adjust the tension on the chains.

Figure 3:
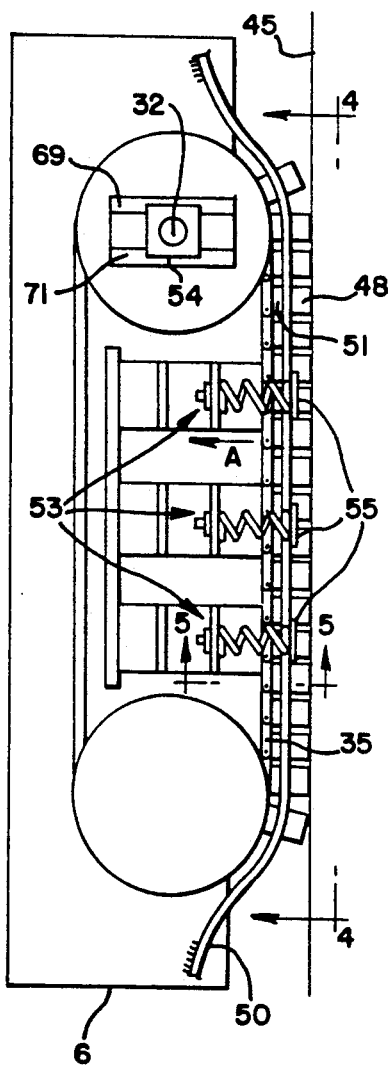
FIGS. 3 is a detailed view of one of the magnetic treads of the blast machine taken along line 3—3 of FIG. 2.
Figure 4:
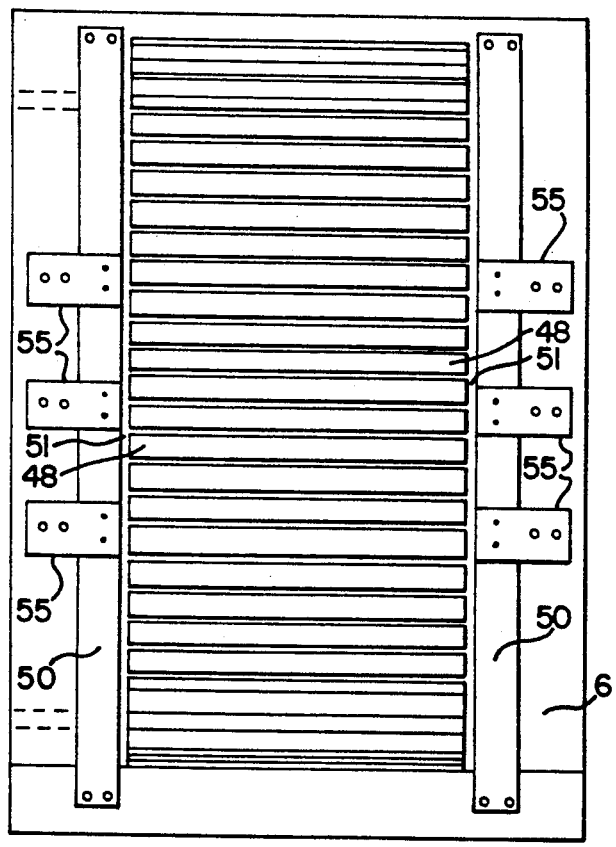
FIG. 4 is a view of the magnetic tread taken along line 4—4 of FIG. 3.
Figure 5:
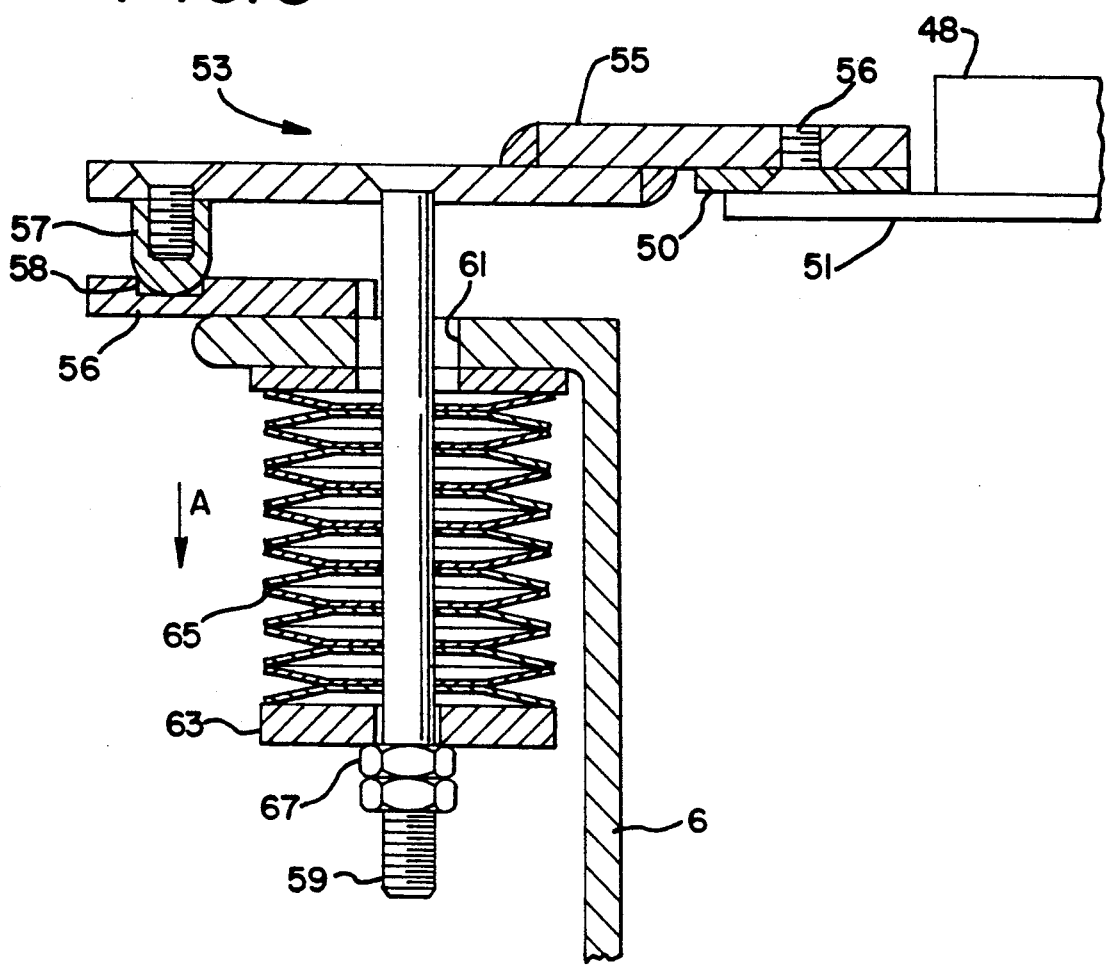
FIG. 5 is a view of the magnetic tread taken along line 5—5 of FIG. 3.

A plurality of permanent magnets 48 span the chains 35 and are secured thereto such that together the chains and magnets form the magnetic treads. To ensure that all of the magnets that contact the surface to be cleaned 45 support a portion of the weight of the blast machine, pressure strips 50 are provided as best shown in FIGS. 3, 4 and 5. Pressure strips 50 are strips of high molecular strength plastic having a low coefficient of friction. Strips 50 are fixed to the frame 6 at their opposite ends and extend over and contact extension bars 51 which are fixed to and extend from each end of magnets 48. A plurality of pressure applying mechanisms 53 are provided to exert pressure on extension bars 51 in a direction away from the surface to be cleaned as represented by arrow A (FIGS. 3 and 5). Referring more particularly to FIG. 5, each pressure applying mechanism 53 consists of a pressure plate 55 that is fixed to strip 50 by any suitable fastener 56. Pressure plate 55 is fixed to a post 57 that sits in a notch 58 formed in plate 56 (plate 56 being fixed to frame 6) to create a fulcrum point about which the pressure plate 55 is capable of limited pivoting motion. A bolt 59 is fixed to plate 55 and extends through and is slidably movable through hole 61 formed in frame 6. Mounted on bolt 59 by nut 67 is a spring seat 63. A compression spring 65 is located between frame 6 and seat 63 to exert a force on pressure plate 55 via bolt 59 in the direction of arrow A. By tightening or loosening nut 67 the distance between frame 6 and seat 63 can be varied thereby to increase or decrease the force exerted by spring 65 on plate 55.

The arrangement shown in FIGS. 3-5 spreads the weight of the blast cleaner over all of the magnets that are in contact with the surface to be cleaned to provide a greater overall attractive force between the tread units and the surface. This arrangement is particularly useful when the device is disposed in an upside down orientation, as shown in FIG. 3, where the center magnets would otherwise provide little or no support for the blast unit.

Still referring to FIG. 3, an added freedom of movement can be provided by allowing limited reciprocating movement of one end of axle 32 in a direction substantially perpendicular to the surface to be cleaned. Specifically, bearing 54, which supports axle 32, is mounted between rails 69 and 71 such that it can "float" along the rails towards and away from the surface to be cleaned as the contour of the surface to be cleaned changes. This reciprocating movement of the one end of axle 32 allows the magnetic treads to flex and follow the contour of the surface as it changes.

Referring more particularly to FIGS. 1 and 2, the blast unit 1 includes a pair of blast wheels 60 and 62 oriented to project abrasive along blast corridors 64 and 66, respectively, into blast zone 68 (best shown in FIG. 8) and onto the surface 45. After striking the surface, the abrasive and the debris generated as the surface is cleaned fall by force of gravity into reclamation corridors 70 and 72.

A pair of screw conveyors 74, 76 collect the abrasive and debris from the bottom of corridors 70 and 72, respectively, and deliver them to the top of separators 78 and 79. Separators 78 and 79 are identical and operate to separate the debris from the abrasive, and direct the debris to the collector 81 and the reusable abrasive back to blast wheels 60 and 62.

Separator 78 is shown in greater detail in FIGS. 6 and 7, and is specifically designed to operate with the blast machine in: (1) a vertical orientation (illustrated in FIG. 1); (2) a horizontal, upside down orientation (illustrated by rotating FIG. 1 90° counter-clockwise); or (3) any position therebetween. The separator 78 of FIGS. 6 and 7 is shown in the vertical orientation and consists of a chamber 80 having a generally diminishing cross-section from its upper end to its lower end. A rectangular opening 82 is formed in one of the side walls of chamber 80 for receiving abrasive and debris from screw conveyor 74. An opening 84 is also formed in the bottom of chamber 80 and is connected to blast wheel 60, for delivering clean abrasive back to the blast wheel. An air outflow port 86 is formed in the top of chamber 80 and is connected to collector 81 (See FIG. 1) via hose 88 to deliver the debris from separator 78 to collector 81. An air inflow opening 90 is formed in one wall and communicates with the atmosphere. When fans in collector 81 are operated, air is drawn into chamber 80 through opening 90, through the chamber 80 and out port 86 as indicated by solid arrows in FIG. 7. A pair of baffles 94 and 96 are located in chamber 80 and extend between the sidewalls to partially isolate opening 82 from the interior of chamber 80 and define the path of travel for the flow of air and the abrasive and debris being delivered by screw conveyor 74. When the blast machine is operating on a vertical surface, the abrasive and debris will be delivered through opening 82 and will fall between the baffles 94 and 96 and into the air stream. The lighter debris will be suspended in the air stream and conveyed out port 86 to the collector 81. The heavier abrasive will not be suspended in the airstream and will fall through chamber 80 out opening 84 to the blast wheel.

The orientation of separator 78 when the blast machine is operating on the lower portions of a ship hull (i.e. a generally upside down orientation) can be viewed by rotating FIGS. 6 and 7 counter-clockwise 90 degrees. In this orientation the separator will operate as described above except that the abrasive and debris will slide over baffle 94 before entering chamber 80 and the clean abrasive will slide along wall 98 to opening 84. Thus, the separator of the invention will operate when the blast machine is in either a vertical or upside down orientation, or any position therebetween.

The debris delivered to collector 81 falls into buckets 100 when the blast machine is traversing a vertical wall and into buckets 101 when the blast machine is operating upside down as illustrated in FIGS. 1 and 2. Buckets 100 and 101 are removably fixed to collector 81 such that when they become filled with debris they can be removed and emptied.

Figure 9:
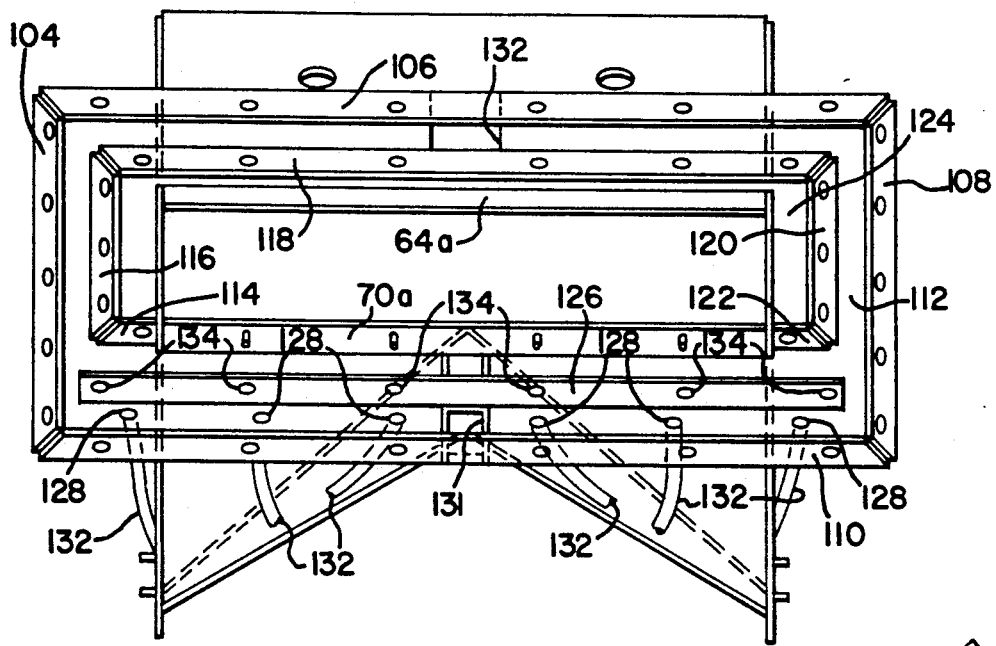
FIG. 9 is a view of the underside of the blast machine showing the blast zone and baffle arrangement.

The blast area of the blast machine is shown in greater detail in FIGS. 8, 9 and 10 and includes the blast corridor 64 through which the abrasive is projected by the blast wheels, the blast zone 68 where the abrasive impacts the surface to be cleaned, and the reclamation corridor 70 for recovering and delivering the spent abrasive and debris to screw conveyor 74, as previously described with reference to FIGS. 1 and 2. More specifically, the outer walls of the blast corridor 64 and reclamation corridor 70 extend as shown at 64a and 70a to define the blast zone 68 and prevent the escape of some of the abrasive and debris.

To further ensure the recapture of substantially all the abrasive and debris, a sealing system is provided surrounding the blast zone. Specifically, a support plate 102 is fixed to the blast corridor 64 and reclamation corridor 70 and is disposed substantially parallel to the surface to be cleaned. Fixed about the periphery of plate 102 is a first set of rigid baffles 104, 106, 108 and 110 which create a chamber 112 as best shown in FIG. 9.

Located inside of the first set of baffles is a second set of rigid baffles 114, 116, 118, 120 and 122 which immediately surround blast zone 68 to form a second chamber 124. Finally, a single rigid baffle 126 is located between the first and second sets of baffles.

A first flexible rubber seal 130 surrounds, is connected to and extends from the fist set of baffles. Seal 130 is formed of a single piece of rubber having a centrally disposed opening 133 that surrounds blast zone 68. The leading and trailing edges 135 and 137, respectively, of seal 130 have a contoured profile where the edge of the seal at any point is disposed at an angle to the direction of travel of the blast machine. By angling the edges of seal 130, the seal can pass over weld seams and other irregularities in the surface to be cleaned without catching on the seams and being distorted or bent backward. A second rubber seal 139 is disposed over and secured to the second set of baffles. Seal 139 also has a centrally disposed opening that is slightly smaller than the opening 133 in seal 130. The leading edge 141 and trailing edge 143 of seal 139 are contoured as explained with reference to seal 130. Finally, an intermediate seal 145 is secured to baffle 126 and is also provided with a contoured edge 147.

As a result, abrasive and debris that escape from the blast zone will be trapped in the chambers defined by the baffles and seals. To reclaim these particulates, the airflow generated in the system from the collector fan is allowed to flow into the chambers via opening 132 and circulates in the chambers defined by the baffles and seals to propel the abrasive and debris towards opening 131 which is in communication with chambers 70 and 72 as best shown in FIG. 9. A plurality of holes 128 are formed in plate 102 and are connected to reclamation corridors 70 and 72 via hoses 132 to reclaim any abrasive that does not enter opening 131. Moreover, holes 134 are formed in baffle 126 to allow abrasive trapped therein to drain to holes 128. As a result, the trapped particles will be recirculated, under the force of gravity and the air circulating in the system, back to the reclamation corridors such that the loss of abrasive and the escape of dust and debris is minimized.

Figure 10:
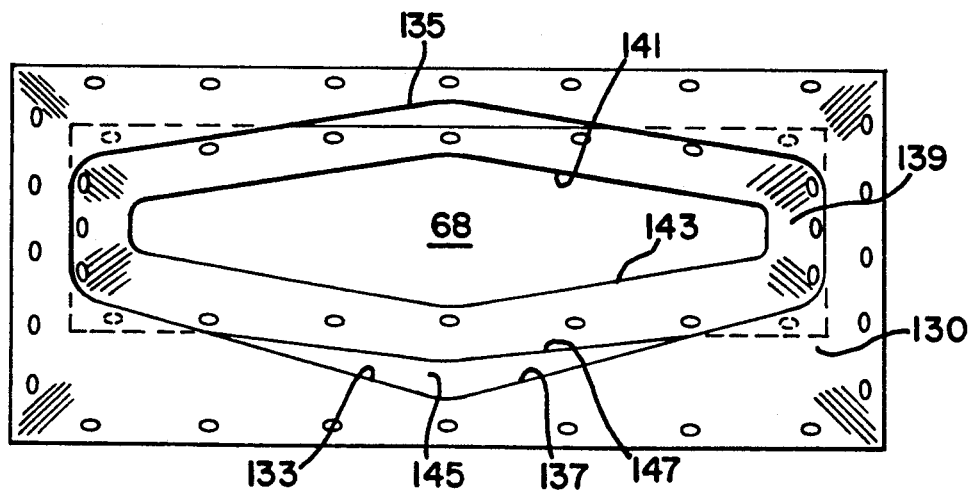
FIG. 10 is a view of the underside of the blast machine similar to FIG. 9 showing the arrangement of the seals.

As will be evident by FIGS. 8 and 10, the ability of the blast machine to reclaim the abrasive and debris will work best when the seals 130, 139 and 145 are disposed flush with the surface to be cleaned. Because ship hulls and the like have curving, contoured surfaces, the orientation of the blast unit relative to the surface would be constantly changing absent compensating mechanism 136 (see FIGS. 1 and 2). Moreover, as is evident from FIG. 1, the weight of blast unit 1 will have a tendency to pull the blast machine away from wall 45 by rotating the blast machine away from the wall about a moment arm terminating at the lowest point where the magnets 48 contact the wall. The compensating mechanism 136 extends the moment arm to the point where wheel 138 contacts wall 45 which greatly increases the force required to pull the machine off the wall.

The compensating mechanism 136 includes an arm 140 mounted to frame member 4 at pivot 149. A caster-type wheel 138 is mounted to the underside of arm 140 such that it can pivot about axis B when the blast machine turns. A motorized screw jack 142 is mounted between arm 140 and beam 144, beam 144 being fixed between chambers 70 and 72. Wheel 138 rides on the surface 45, thereby maintaining the orientation of the blast unit 1 relative to the surface. The extension and/or retraction of screw jack 142 causes the blast unit 1 to pivot relative to the track units 2 and 3 and changes the orientation of the blast unit relative to the surface 45. By properly manipulating screw jack 142, the orientation of the blast unit relative to the surface can be kept constant, even though the curvature of the surface being cleaned changes, thereby to maintain the orientation of seals relative to the surface. The screw jack 142 can be controlled either manually or automatically. To automatically control screw jack 142 a proximity sensor 148 is provided near blast zone as best shown in FIG. 8. Screw jack 142 is automatically adjusted in response to the signal provided by sensor 148 to maintain a constant orientation of the blast unit relative to the surface. Moreover, as will be evident from FIG. 1, the use of wheel 138 greatly increases the moment arm through which the weight of the machine must act to pull the magnetic treads from surface 45. As a result, the blast machine is prevented from pulling off of surface 45.

Figure 12:
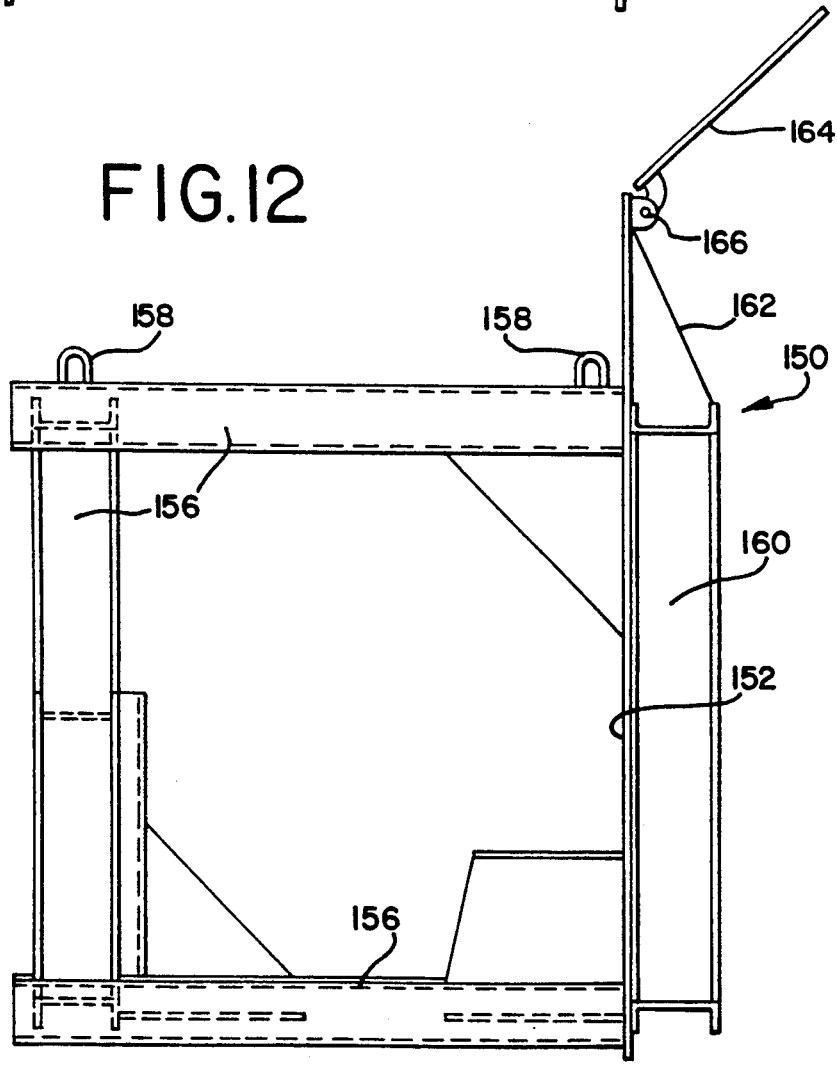
FIG. 12 is a side view of the transport table.
Figure 11:
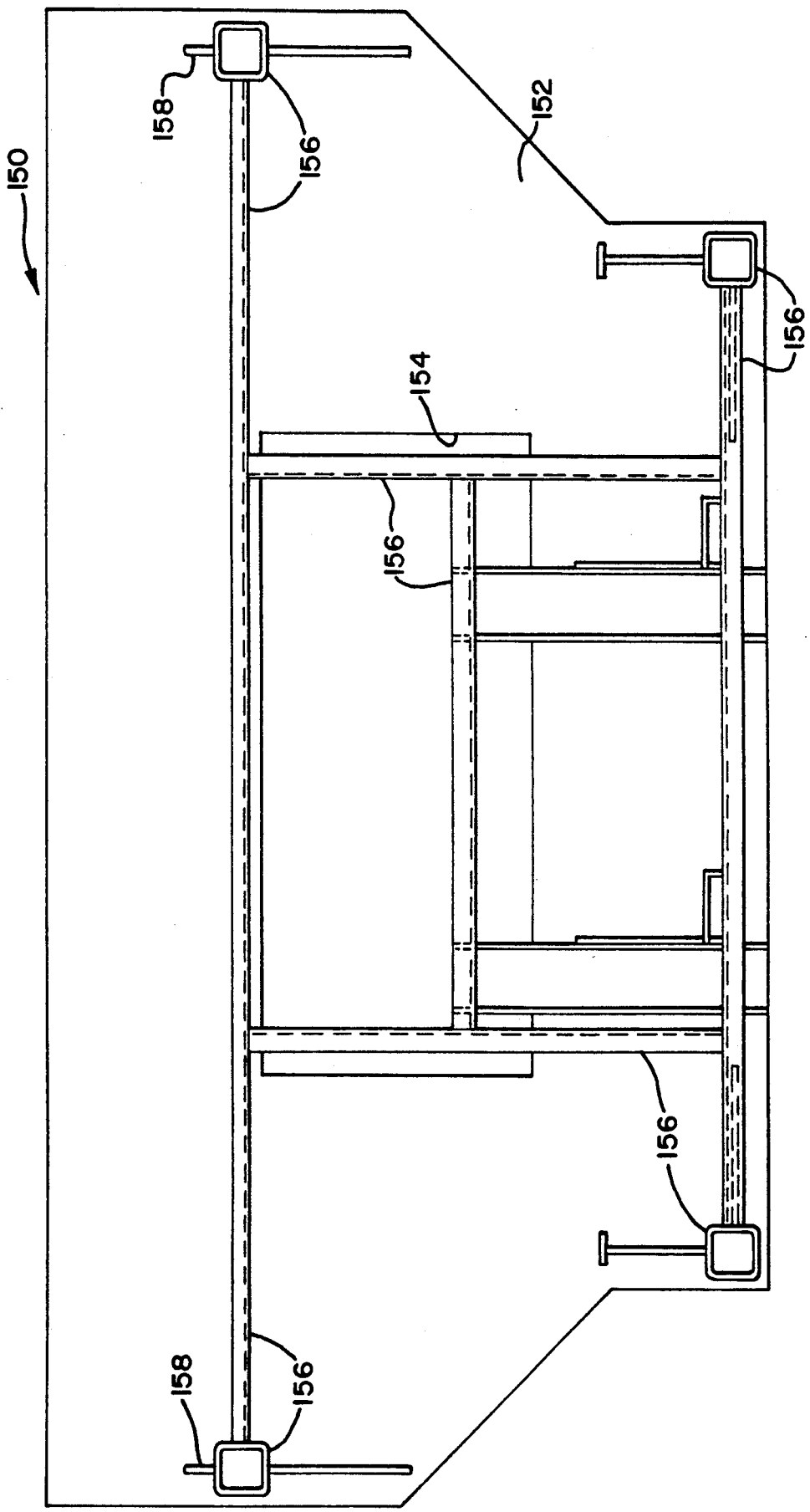
FIG. 11 is a front view of the transport table for transporting and testing the blast machine.

The transport table of the invention is shown generally at 150 in FIGS. 11 and 12 and consists of a platform 152 having a door 154 formed therein. A plurality of beam members 156 are provided to add rigidity to the structure and to protect the blast machine. To load the transport table, the table is oriented with platform 152 disposed horizontally (illustrated by rotating FIG. 12 clockwise 90 degrees). The blast machine is driven onto platform 152 under its own power such that the blast zone 68 overlies the door 154. To test the blast pattern, the blast wheels are operated over door 154. The door can be opened and the blast pattern etched thereon can be observed to determine if the blast wheels are functioning properly.

A derrick or crane can engage eyelets 158 and lift platform 152 into the upright position shown in FIGS. 11 and 12. Because platform 152 is constructed of steel, the blast machine 1 will remain secured to platform 152 due to the magnetic attraction between the magnetic treads and the steel platform, and will be oriented in the vertical position of FIG. 1. The platform 152 can then be positioned adjacent the ship hull or other vertical surface by the crane and the blast machine 1 driven from platform 152 onto the surface under its own power. To facilitate this operation, the support structure 160 for platform 152 has a beveled surface 162 that allows the platform 152 to be placed tangent to a ship hull. Because the radius of curvature of ship hulls and the like can vary greatly, in a preferred embodiment, extensions 164 are provided to facilitate the transfer of the blast machine from the transport table to the surface to be cleaned. Extensions 164 can be pivoted relative to surface 152 about pivot pins 166 such that they can be collapsed when the support is transported.

All of the operations of the blast machine are designed to be controlled by a remote control connected to the machine by cabling or a radio control device. Thus, the operator can be positioned in any convenient, safe location remote from the blast cleaning operation. Using a remote control, the operator can control the speed and direction of the machine, the operation of the blast unit and the orientation of the unit relative the surface.

While the invention has been described in some detail with particular reference to the drawings, it is to be appreciated that the invention is to be limited only as set forth in the appended claims.

What is claimed is:

1. A machine for blast cleaning vertical surfaces, the underside of horizontal surfaces or surfaces orientated an any angle between vertical and horizontal and which are formed of ferromagnetic material, comprising:

a) a blast unit including means for projecting abrasive against a surface being cleaned at a blast zone, means for reclaiming the abrasive and debris generated when the abrasive strikes the surface, means for separating abrasive from debris and means for returning the abrasive to the projecting means;

b) means for supporting the blast unit on said surface being cleaned and for propelling the blast unit over said surface comprising first and second magnetic treads, each of said first and second magnetic treads having sections contacting said surface, said blast unit supported on said means for supporting such that said blast zone is on the same side of the machine as the sections contacting said surface, said first and second magnetic treads driven at a speed by a means for driving and controlling the speed of said magnetic treads whereby the speed and direction of travel of the blast unit can be controlled; and c) means for connecting the first and second magnetic treads to the blast unit such that the blast unit can pivot relative to the first and second magnetic treads.

2. The blast machine according to claim 1, wherein said means for projecting abrasive comprises at least one blast wheel projecting abrasive through a blast corridor and onto a blast zone on the surface.

3. The blast machine according to claim 2, wherein the means for reclaiming comprises a reclamation corridor extending from the blast zone.

4. The blast machine according to claim 1, wherein the means for connecting allows the magnetic means to pivot relative to the blast unit along two axes.

5. The blast machine according to claim 1, further including means for adjusting tension on the treads.

6. The blast machine according to claim 1, wherein the magnetic treads include a plurality of permanent magnets and pressure means for ensuring that all of the permanent magnets facing said surface support a portion of the weight of the blast machine.

7. The blast machine according to claim 6, further including pressure means for applying pressure to said treads in a direction away from the surface.

8. The machine according to claim 6, said pressure means includes means for applying a force to the sections of magnetic tread that are in contact with the surface in a direction away from the surface.

9. The blast machine according to claim 1, wherein the means for reclaiming includes a plurality of rigid baffles surrounding the blast zone.

10. The blast machine according to claim 9, wherein the baffles define chambers which collect the spent abrasive and debris.

11. The blast machine according to claim 10, further including means for returning the spent abrasive and debris from the chambers to a reclamation corridor, said reclamation corridor extending from the blat zone.

12. The blast machine according to claim 11, wherein the means for returning the spent abrasive includes portions of said chambers defining apertures, said apertures being connected to said reclamation corridor by a conduit means.

13. The blast machine according to claim 9, further including means for providing air flow in the chambers.

14. The blast machine according to claim 1, wherein the means for reclaiming includes a plurality of flexible seals surrounding the blast zone.

15. The blast machine according to claim 1, wherein the means for separating includes a separator having means for allowing the spent abrasive to be separated from the debris when the separator is in a vertical orientation, an upside down orientation or any position therebetween.

16. The blast machine according to claim 15, wherein the means for allowing the spent abrasive to be separated from the debris includes an inlet opening for receiving the abrasive and debris, an outlet opening for discharging abrasive, an air inlet opening for receiving air flow, an air outlet opening for discharging air and debris, and a baffle means for directing the air, abrasive and debris to its respective opening.

17. The blast machine according to claim 1, further including a transport table for supporting the blast machine while being transported to the surface to be cleaned including means for supporting the blast machine in a vertical orientation.

18. The blast machine according to claim 17, wherein the means for supporting includes a ferromagnetic surface that magnetically attracts the magnetic drive unit.

19. The blast machine according to claim 17, the transport table further includes means engageable with the surface to be cleaned that allows the blast machine to be propelled from said means for supporting to said surface to be cleaned.

20. The blast machine according to claim 17, wherein the transport table further includes means for testing the blast pattern of the blast cleaner.

21. The machine according to claim 20, wherein said means for testing the blast pattern includes a portion of the transport table located adjacent the blast zone being removable from the transport table whereby it can be observed.

22. The machine according to claim 1, wherein said blast unit is supported at an orientation relative to said surface, and further including means for adjusting the orientation of the blast unit relative to the surface comprising means for pivoting the blast unit relative to the magnetic treads, said means for pivoting operating in response to a signal indicative of the orientation of the blast unit relative to the surface.

23. The machine according to claim 22, wherein said signal is generated by a sensor that detects the position of the blast unit relative to the surface.

24. The machine according to claim 1, wherein the means for adjusting the orientation includes an arm having one end pivotably connected to the magnetic treads and the opposite end extending beyond the magnetic treads and means supported on the arm for contacting the surface.

25. The machine according to claim 24 wherein the means for adjusting the orientation further includes a means for changing the position of the blast unit relative to said arm.

26. The machine according to claim 25, wherein said means for changing includes a screw jack extending between the arm and the blast unit.

27. The machine according to claim 1, further including means for allowing the magnetic treads to flex about an axis parallel to the direction of travel of the machine.

28. The machine according to claim 27, wherein the means for allowing the magnetic treads to flex includes an axle supporting the magnetic tread, one end of said axle being supported in a bearing that is free to float in a direction substantially perpendicular to the surface.

29. The machine according to claim 1, wherein the means for reclaiming includes a plurality of rigid baffles surrounding the blast zone, said baffles supporting at least one flexible seal where said flexible seal consists of a single piece of flexible material having portions defining an opening having an edge, the edge of the opening contacting the surface and surrounding the blast zone.

30. The machine according to claim 29, wherein the edges of the opening are disposed at an angle relative to the direction of travel of the machine.

31. A self-propelled machine for blast cleaning vertical surfaces, the underside of horizontal surfaces or surfaces oriented at any angle between vertical and horizontal formed of ferromagnetic material, comprising:
   a) a blast unit means for projecting abrasive against a surface being cleaned at a blast zone, means for reclaiming the abrasive and debris generated when the abrasive strikes the surface, means for separating the abrasive from debris, and means for returning the abrasive to the projecting means;
   b) a magnetic drive unit including a frame supporting a means for movably supporting a magnetic tread consisting of a plurality of permanent magnets, a section of said permanent magnets contacting said surface to support said blast unit on said surface, means for driving said magnets whereby the magnets propel the blast unit over the surface; and
   c) means for mounting said blast unit to said frame such that said blast zone is on the same side of the machine as the section of said permanent magnets contacting said surface and said blast unit can pivot relative to said frame about two axes to follow contours of the surface.

* * * * *